Aug. 22, 1961 W. H. RYAN ET AL 2,996,956
LIGHT-POLARIZING FILM MATERIAL AND THE
PROCESS OF PREPARATION
Filed March 27, 1958

INVENTORS
William H. Ryan
and
BY Howard C. Haas

Brown and Mikulka
ATTORNEYS

United States Patent Office 2,996,956
Patented Aug. 22, 1961

2,996,956
LIGHT-POLARIZING FILM MATERIAL AND THE PROCESS OF PREPARATION
William H. Ryan, Lincoln, and Howard C. Haas, Arlington, Mass., assignors to Polaroid Corporation, Cambridge, Mass., a corporation of Delaware
Filed Mar. 27, 1958, Ser. No. 724,320
18 Claims. (Cl. 88—65)

This invention relates to an improved light-polarizing film material and to a method of forming the material.

Objects of the invention are to provide a new and improved light-polarizing film material which exhibits a high dichroic or density ratio in comparison with previously known dichroic dye light-polarizing films; to provide an improved light-polarizing film material which incorporates, at least during its formation, a hydroxyl-containing vinyl polymer, a basic nitrogen-containing polymer, a cross-linking agent and a dichroic direct cotton dye in such a manner as to provide said high dichroic or density ratio; to provide a film material as described wherein the dye is distributed so as either to polarize light uniformly throughout its area or to polarize light differentially in image areas thereof; to provide a light-polarizing film material of the character described wherein said high density ratio is accompanied by a suitable dye density; to provide a light-polarizing film-material of the character described wherein the hydroxyl-containing vinyl polymer is polyvinyl alcohol, the basic nitrogen-containing polymer is a linear, high molecular weight, water-soluble polymer selected from the class consisting of a polyvinyl acetal of an amino aldehyde, deacetylated chitin, a β-diethylaminoethylmethacrylate polymer, and a polyvinyl pyridine quaternary ammonium salt, and the cross-linking agent is one selected from the class consisting of dimethylolurea, boric acid, glyoxal, and diphenyl diisocyanate; to provide a light-polarizing film material of the character described in which one of, or both, the basic nitrogen-containing polymer and cross-linking agent are added to the hydroxyl-containing vinyl polymer when the latter is either in the form of a solution to be employed in casting the film or already in the form of a cast film; and to provide a light-polarizing film material of the character described wherein there exists a direct relation between the concentration of the basic nitrogen-containing polymer and the axial ratio of the molecularly oriented film and between the content of the aforesaid polymer and the concentration of the cross-linking agent.

Further objects of the invention are to provide a novel light-polarizing film material which exhibits improved dye receptivity and dye fastness; to provide dichroic dye, light-polarizing image areas which are held fast against lateral diffusion, which have improved definition, and which are adapted to reduce the perceptibility of unwanted "ghost" images to a minimum; and to provide light polarizers of the character described in the form of individual transparencies, reflection prints or motion picture sequences which are bonded to support or base materials and which may comprise stereoscopic pairs of light-polarizing images having angularly disposed light-polarizing axes, said images being rendered either in monochrome or in one or more colors.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
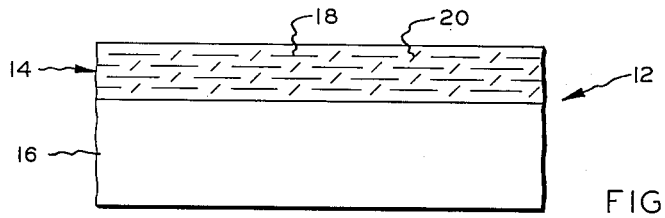
FIGURE 1 is a diagrammatic side view of a film material of the invention adapted to be used in forming a light polarizer.

Known methods of producing light-polarizing film materials include that of imbibing a dichroic direct cotton dye into a plastic film material of a type which has been stretched to provide therein a high degree of molecular orientation. The plastic film material may, for example, be composed of a transparent, molecularly oriented, linear, high molecular weight, hydroxyl-containing vinyl polymer, a preferred form of said material being polyvinyl alcohol. Where the dichroic dye is adsorbed by the film material, the latter is rendered light polarizing. The dichroic dye may be distributed uniformly throughout the film material, in which instance a light-polarizing sheet of substantially uniform density is provided which may be employed for various purposes, for example, in the ophthalmic and photographic fields in the production of light-polarizing lenses and filters. On the other hand, the dye may be distributed differentially throughout the film material, as provided by a line, half-tone or full-tone printing or transfer method in the formation of light-polarizing images of photographic quality. Such images are employed in forming stereoscopic prints in which the right- and left-eye polarizing images usually have their polarizing directions extending at 90° with respect to one another. This is made possible by printing from printing matrices or other printing means each of a stereo pair of monochromatic dichroic dye images or the several color images making up a pair of stereoscopic images in full color on individual molecularly oriented films of the type above described, the two films of a stereoscopic pair being laminated to a support in superposed relation and with their directions of molecular orientation preferably being relatively disposed at 90°.

In the production of dichroic dye light polarizers of high efficiency it is generally desirable that they shall polarize light throughout the visible spectrum of 400–700 mμ and that the dichroism or dichroic ratio, alternatively termed the density ratio $P_d$ and hereinafter given the latter appellation, shall be as large as possible. However, previous manufacturing methods relating to dichroic dye polarizers have, in general, not contributed to the obtaining of high density ratios, even though possessing other advantages, and, in fact, more often than not they may have operated against such an objective. In this category may be mentioned, as independent procedures, the use of cross-linking agents for providing dimensional stability of the film and the employment of dye mordants for facilitating transfer of the dichroic dye to the film and stabilizing the dye therewithin. As hereinbefore intimated, it is a principal object of the present invention to produce light-polarizing film materials having high density ratios in addition to possessing such other attributes as satisfactory dye densities, a high order of image definition, and excellent dimensional stability. The term "dichroic," as applied to light polarizers has the meaning "exhibiting anisotropic absorption of light," that is, exhibiting differential absorption of the components of an incident beam depending upon the vibration direction of the components. It is to be understood with respect to the production of a light polarizer of the type contemplated herein that the property of dichroism manifests itself only when the film is a molecularly oriented film, this condition, accordingly being prerequisite to the obtaining of high density ratios. Thus, any use of substances of the type mentioned herein in conjunction with a molecularly unoriented material would bear no relation to the production of a dichroic dye light polarizer.

A brief preliminary consideration of the properties and operation of dichroic light polarizers, in general, is believed to be in the interests of making clear the particular qualities of film materials of the present invention which relate to dichroism. The light-polarizing properties of polymeric film materials of the type contemplated herein can be ascribed to an adequate area concentration of oriented dichroic material. Dichroic polarizers have differing dimensional characteristics and, in film materials of the invention, one of these dimensions can be made very large as by stretching the film to obtain a high degree of molecular orientation. Assuming the film to be stretched in a given direction, the long dimension in the plane of the film may be termed the $z$ direction; the transverse direction in the plane of the film the $y$ direction; and the normal to the $y$—$z$ plane the $x$ direction.

The dichroic polarizer has at least orthorhombic symmetry with principal absorption coefficients $a_x$, $a_y$, $a_z$ associated with the aforesaid three nonequivalent directions. The polarizing effect depends upon the inequality $a_y \neq a_z$. In producing the light-polarizing film material, the significant variables are the area concentration $C$ of oriented dichroic material, i.e., oriented molecular groups having an adsorbed dichroic dye, and the degree of orientation thereof. The area concentration $C$ can be varied practically at will over a wide range. The degree of molecular orientation of a given dichroic material can be held substantially constant throughout the film and, for maximum efficiency, is at or near the practical maximum obtainable for said dichroic material.

From the aforesaid principal absorption coefficients $a_y$ and $a_z$ and the area concentration $C$ may be expressed the principal densities $d_y$ and $d_z$ as follows:

$$d_y = a_y C$$
$$d_z = a_z C$$

where $C$ is in mass per unit area and where, accordingly, $a_y$ and $a_z$ are the absorption coefficients in mass per unit area of the dichroic material. The principal densities are thus seen to be proportional to the amount of absorbing material per unit area.

The relation of the density and absorption ratios may be expressed as follows:

$$R_d = d_z/d_y = a_z/a_y$$

The density ratio $R_d$ having been seen as equal to the ratio of the principal absorption coefficients, it follows that $R_d$ is a constant for a given dichroic material with respect to variation of the area concentration $C$ or to variation of the thickness of the film, provided said area concentration is not increased to a critical value such that the density $d_z$ will no longer increase in proportion to increases of $C$. However, the transmittance ratio $R_t$, namely, the ratio of the transmittance of polarized light with the electric vector parallel to the $y$ direction to the transmittance of polarized light with the electric vector parallel to the $z$ direction, is not independent of the area concentration $C$ and increases exponentially therewith. The density ratio $R_d$ may, alternatively, be expressed as $d_2/d_1$ according to usage in the light-polarizing art, $d_1$ being considered as the density (theoretically zero) pertaining to observation of a polarizer through an analyzer with transmission axes parallel and $d_2$ as the density (theoretically infinite) when the analyzer is rotated 90°. In dye polarizers, such as may be used in the production of multicolor light-polarizing images, the values $d_z$ and $d_y$ ($d_2$ and $d_1$) vary with wavelength, the density ratio $R_d$ thus also being caused to vary with wavelength. For a further discussion of the aforesaid theoretical considerations, reference may be had to the Journal of the Optical Society of America, vol. 41, No. 12, pp. 976–986, December 1951, "On the Properties of Polarization Elements as Used in Optical Instruments" by C. D. West and R. Clark Jones, and to Colloid Chemistry, vol. 6, chapter 6, pp. 160–190, Reinhold Publishing Corporation, 1946, "Dichroism and Dichroic Polarizers" by Edwin H. Land and C. D. West.

The high order of molecular orientation of a hydroxyl-containing vinyl polymer, such as polyvinyl alcohol, contributing to desired density ratios and polarizing efficiency of the film when subsequently dyed, is usually obtained by stretching the polymer when it is in the form of a film. Stretching of this film, prior to the usual procedure of laminating it to a supporting transparent base material, is preferably performed in the presence of heat or a softening agent, the direction of molecular orientation being substantially parallel to the direction in which the opposed tensional forces are applied. The degree of stretch imparted to a plastic film is empirically measured by what, in the light-polarizing art, has been termed the axial ratio. The axial ratio is determined from a small circle printed on the film prior to stretching. The circle is converted to an ellipse by the stretching operation, the major axis of the ellipse extending in the direction of stretch. The axial ratio is the ratio of the major axis to the minor axis of the ellipse. In general, high axial ratios are identified with high efficiency of the film when converted to a light polarizer. An axial ratio of the order of 3 and greater is a characteristic of a dichroic dye polarizer of high molecular orientation. Current production practices, for example, are adapted to provide axial ratios of approximately 6 for molecularly oriented polyvinyl alcohol film. The present invention, involving the formation of light-polarizing images, contemplates the production of film materials having axial ratios of 6 and higher. For some purposes, however, lower axial ratios as, for example, an axial ratio of 4.5 may be satisfactory.

To produce an improved light-polarizing film having a density ratio superior to that which has previously been obtainable in a dichroic dye polarizer, the present invention contemplates the formation of a film of high molecular orientation in which two different high molecular weight polymers are combined with a cross-linking agent and a dichroic direct cotton dye. Thus, a high molecular weight, hydroxyl-containing, film-forming, vinyl polymer is combined with a linear, high molecular weight, water-soluble, basic nitrogen-containing polymer and a cross-linking agent. The cross-linking agent is difunctional and has functional groups capable of reacting with the hydroxyl groups of the aforesaid hydroxyl-containing vinyl polymer or, where applicable, with residual hydroxyl groups of a basic nitrogen-containing polymer to form covalent bonds resulting in cross-linking and concurrent reduction of water solubility. A dichroic direct cotton dye is then imbibed into the molecularly oriented film which has been formed from the aforesaid substances.

A preferred hydroxyl-containing vinyl polymer for use in forming the film material of the invention is polyvinyl alcohol. Suitable basic nitrogen-containing polymers for incorporation therewith in the interests of providing said improved density ratios comprise such compounds as deacetylated chitin, a polyvinyl acetal of an amino aldehyde or a normal or quaternary salt thereof, a β-diethylaminoethylmethacrylate polymer, and a polyvinyl pyridine quaternary ammonium salt. Preferred cross-linking agents which, when combined with other of the aforementioned substances, contribute to improved density ratios comprise dimethylolurea, boric acid, glyoxal and diphenyl diisocyanate.

The aforementioned materials may be combined in various ways to form the improved light-polarizing film materials of the invention. Thus, for example, a solution essentially comprising a polyvinyl acetal type of basic nitrogen-containing polymer and incorporating the cross-linking agent may be cast directly into a film. The film may then be laminated to a supporting plastic base and treated with a dichroic direct cotton dye. Alternatively, for example, the reaction product of the hydroxyl-containing vinyl polymer and a quaternary salt of an amino aldehyde as obtained in the presence of an acid catalyst, or another of the above-named basic nitrogen-containing polymers may be added to a further quantity of the hydroxyl-containing vinyl polymer in solution and the mixture cast into a film, the cross-linking agent being added either to the solution or imbided into the cast film. Again, the film may be cast from a hydroxyl-containing vinyl polymer and both the reagent which yields the basic nitrogen-containing vinyl polymer through reaction with polyvinyl alcohol and the cross-linking agent added after the film has been cast. In any event, it is preferable to include or form the basic nitrogen-containing polymer and to add the cross-linking agent prior to the step of stretching the film to obtain its molecular orientation, this order of procedure being considered as imperative with respect to the cross-linking agent. A further method contemplates casting the film with the basic nitrogen-containing polymer incorporated therein and adding the cross-linking agent to the sheet after casting. Depending upon which of the foregoing methods is employed in forming the light-polarizing film materials, certain differences of structure will be seen to exist, as explained below with reference to the drawings. Despite these structural differences, however, each film will be noted as functioning in a manner generally similar to that of another. Irrespective of the structure of the film material thus obtained, it will be noted, in contrast to conventional light polarizers which are formed of molecularly oriented and dyed polyvinyl alcohol, that the present light-polarizng film material may, for example, comprise a mixture of polyvinyl alcohol with a basic nitrogen-containing polymer and a cross-linking agent, or a mixture or compound formed from the reaction product of polyvinyl alcohol and the basic nitrogen-containing polymer with the cross-linking agent.

FIG. 1 illustrates diagrammatically and in highly exaggerated form a fragment of a composite film material 12 of the invention wherein a stretched, molecularly oriented, transparent plastic film 14 is bonded to a transparent plastic base 16, said elements 14 and 16 thus constituting layers of the composite material. It may be assumed, for example, that the layer 14 has been formed from a cast solution of a type above mentioned and to be described in greater detail below, namely, from an aqueous casting solution comprising polyvinyl alcohol which has been at least partially reacted in the presence of an acid catalyst with a quaternary salt of an amino aldehyde and a cross-linking agent to form a substantially homogeneous layer. The oriented polymeric molecular content and alignment of the layer 14 is diagrammatically shown by the longitudinally-extending broken lines 18; the diagonal broken lines 20 represent the cross-linking agent. Base 16 is formed of a suitable plastic material which is dimensionally stable and thus contributes to the holding of layer 14 in its stretched condition as, for example, of cellulose acetate butyrate or cellulose triacetate. A suitable bonding agent, surface treatment, and one or more subcoats, as may be necessary, are employed for laminating the layers 14 and 16 together.

The method contemplated herein involves the use of dichroic direct cotton dyes in conjunction with the molecularly oriented film produced from the aforesaid high molecular weight, hydroxyl-containing vinyl polymer, the basic nitrogen-containing compound, and the cross-linking agent, one or more of said dyes being adsorbed into the film to render it light polarizing. More particularly, the invention contemplates the use of direct cotton dyes which have sulfonic acid groups, phenolic hydroxyl groups or carboxylic acid groups. Examples of direct cotton dyes which are suitabe for the purpose are Niagara Sky Blue 6B (C.I. 518), Solophenyl Fast Blue Green BL 200%, or Niagara Sky Blue (C.I. 520) for cyan; Solantine Red 8BL (C.I. 278), Chlorantine Fast Red 5B, or Solantine Pink 4BL (C.I. 353) for magenta; Solantine Yellow 4GL (Prototype 53), Pyrazoline Orange 5G, or Stilbene Yellow 3GA (C.I. 622) for yellow; and Erieform Violet 2R for blue-violet. In conformance with the aforesaid considerations with respect to proper dyes, it will be apparent that basic dyes which lack an acid group would be unsuitable for the purpose.

Figure 2:
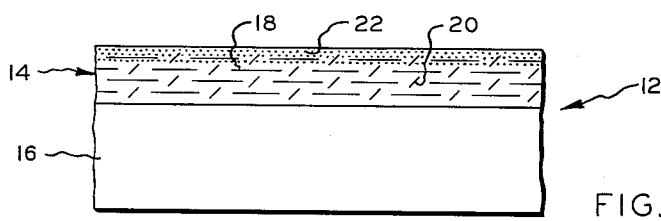
FIG. 2 is a diagrammatic side view of the film material of FIG. 1 after treatment with a dye to form a light polarizer.

FIG. 2 is a highly exaggerated representation of a fragment of film material similar to that shown in FIG. 1 but additionally includes a dichroic direct cotton dye of a type above described which has been introduced into the film and adsorbed by the oriented molecules of the layer 14, the dye 22 being shown as having penetrated only a limited distance within the layer. The dyed film material of FIG. 2 exemplifies a light-polarizing film having a high density ratio and constituting a light polarizer of superior efficiency. The following table indicates typical density ratios obtained relative to light-polarizing film-materials formed according to the method of the present invention. In each instance the film was wetted prior to dyeing.

| 1 | 2 | 3 | 4 | 5 | 6 | 7 |
|---|---|---|---|---|---|---|
| Direct Cotton Dye | Basic Nitrogen-containing Polymer | Hydroxyl-containing Vinyl Polymer | Cross-linking Agent | Density Ratio | Density Ratio without #4 | Density Ratio without #2 and #4 |
| Chlorantine Fast Red | A polyvinyl acetal of benzaldehyde-4-trimethyl ammonium iodide. | Polyvinyl alcohol | Dimethylolurea | 21.5 | | 15.9 |
| Solantine Red 8BL (C.I. 278). | ___do___ | ___do___ | ___do___ | {15.3 1-color / 14.9 3-color} | 7.7 | |
| Solophenyl Fast Blue Green BL 200%. | ___do___ | ___do___ | ___do___ | {16.8 1-color / 12.4 3-color} | 3.6 | 6.8 |
| Pyrazoline Orange 5G | ___do___ | ___do___ | ___do___ | {19.1 1-color / 11.7 3-color} | 5.8 | 14.2 |
| Erieform Violet 2R | ___do___ | ___do___ | ___do___ | 13.0 | | 10.3 |

The reason for the improved density ratios characteristic of the light-polarizing materials described herein has not been entirely established. It is believed, however, that the presence of the basic nitrogen-containing polymer and the cross-linking agent with the hydroxyl-containing vinyl polymer and dichroic direct cotton dye primarily serves to maintain a high degree of molecular orientation adjacent that surface of the film into which the dye is imbibed, together with providing a marked propensity for receiving the dye. These properties lead to an adequate dichroism and dye density in areas which would otherwise be deficient in one or both respects. In conventional methods of manufacturing light polarizers, treatment of a molecularly oriented film of a hydroxyl-containing vinyl polymer such as polyvinyl alcohol with an aqueous dye or a pretreatment solution and the resulting swelling of the material is believed to disrupt the orientation of the molecules which are loosely arranged adjacent the film surface. Hence, the surface areas, where a large concentration of dye usually exists, are deficient with respect to the property of dichroism. In the method of the present invention, the cross-linking agent is believed to form relatively rigid links between the surface molecules, thus substantially preventing their changing position once aligned. However, the cross-linking agent tends to reduce the ability of the film to absorb an aqueous dye solution. This reduction in dye affinity is overcome by the basic nitrogen-containing polymer which acts to increase the rate of acceptance of the aqueous dye solution.

The ability of the basic nitrogen-containing polymer to offset the decrease in dye acceptance caused by the cross-linking agent is believed to be principally due to the fact that said basic nitrogen-containing polymer carries a positive charge. It is thus particularly effective for use with dichroic direct cotton dyes which include acid residues in their molecular structure as, for example, sulfonic acid groups or phenolic groups, said dyes being thereby negatively charged. The resulting electrostatic attraction between oppositely charged molecules of the polymeric material and dye constitutes a condition where the dye is attracted and held fast in an area which would otherwise not be readily dyeable or which would tend to permit an unwanted lateral diffusion of the dye where dichroic dye images are involved.

As hereinbefore intimated, the stretching operation resulting in a high molecular orientation and the addition of the cross-linking agent providing the cross-linkage of surface molecules operate to lengthen the time which is required for the film to accept a dichroic direct cotton dye, while the addition of the basic nitrogen-containing polymer tends to diminish the time which is thus required, the aforesaid steps, taken together, providing, at least in large measure, the improved density ratios. From a production viewpoint, it is understandably desirable to facilitate the dyeability of the film and it is particularly important that the dye shall be transferred from the matrix to the film as quickly as possible in the process of forming dichoic dye images to reduce any opportunity for the dye to diffuse laterally. Thus, the molecular orientation of the film and the cross-linking agent on the one hand, and the basic nitrogen-containing polymer on the other hand, in addition to their individual functions, may be said to offset each other's deficiencies and, in general, a direct relation exists between the concentration of the basic nitrogen-containing polymer and the concentration of the cross-linking agent as well as between the contration of said polymer and the axial ratio. Thus, by way of example, assuming a condition where an axial ratio of 6 requires a concentration of the basic nitrogen-containing polymer of 0.06 mol per base mol of total vinyl alcohol groups present for satisfactory acceptance of the dye, higher axial ratios would be accompanied by higher concentrations of the polymer while lower axial ratios would require lower concentrations. A direct relation between concentrations of the compound and concentrations of the cross-linking agent is thought to exist which provides the required cross-linkage between the surface molecules, exact quantities generally depending upon manufacturing conditions and the requirements of usage.

Figure 3:
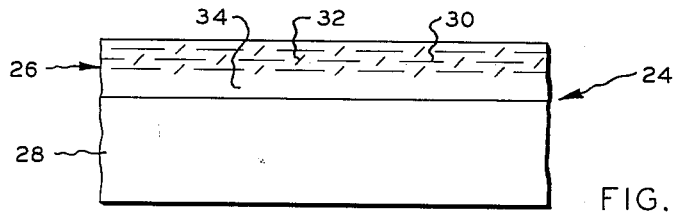
FIG. 3 is a diagrammatic side view of another film material of the invention adapted to be employed in forming a light polarizer.
Figure 4:
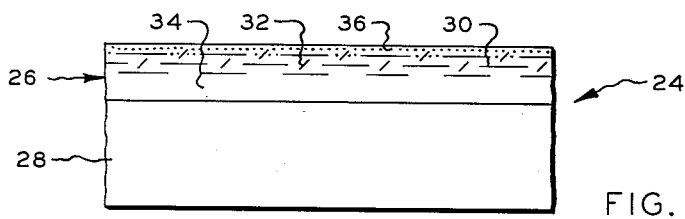
FIG. 4 is a diagrammatic side view of the film material of FIG. 3 after treatment with a dye to form a light polarizer.

FIGS. 3 and 4 illustrate a method of the invention in which an aqueous solution of the basic nitrogen-containing reagent, which when reacted with polyvinyl alcohol, yields a basic nitrogen-containing polymer, together with a cross-linking agent, is imbibed in the form of a single solution or as separate solutions into a molecularly oriented film which has previously been cast from a solution of the hydroxyl-containing vinyl polymer. The film is then dyed with a dichoic direct cotton dye. In FIG. 3 the composite film material 24 comprises a stretched, molecularly oriented, transparent plastic film or layer 26 which is bonded to a transparent base or supporting layer 28. Layer 26 comprises the molecularly oriented basic nitrogen-containing polymer 30, the cross-linking agent 32 and that portion of the hydroxyl-containing vinyl polymer 34 which may remain unaltered or unreacted. In FIG. 4, the film of FIG. 3 is shown with a dichroic direct cotton dye adsorbed therein to form the dyed portion 36.

The following examples are illustrative of the method of forming the light-polarizing film material of the invention.

Example I 32.8 grams of the methyl iodide quaternary salt of paradimethylaminobenzaldehyde were dissolved in 432 grams of water. 1.5 cc. of concentrated hydrochloric acid were added and the solution was thoroughly mixed. 108 grams of powdered polyvinyl alcohol were added and the mixture was continuously stirred until a swelled mass was obtained. The beaker containing the mixture was sealed and the contents allowed to stand overnight at 95° C. The mixture was cooled to between 60 to 70° C. and 360 grams of methanol were stirred in. A solution of 6.12 grams of dimethylolurea (Arboneeld A, trade name of, and manufactured by Polychemicals Department of E. I. du Pont de Nemours & Co., Wilmington, Del.) in 120 grams of water and 0.14 gram of a wetting agent (Triton X-100, trade name of, and manufactured by Rohm & Haas Co., Philadelphia, Pa.) were added to the mixture. The mixture was then filtered and was ready for casting into a film. After casting, the film was stretched to provide its molecular orientation and dyed with a dichroic direct cotton dye.

Example II 20 grams of polyvinyl alcohol flake were added to 150 cc. of water and heated to form a solution. The solution was cooled to approximately 70° C. and 1.5 grams of deacetylated chitin and 2 grams of glacial acetic acid were added. The solution was heated to 95° C. and held at this temperature for 15 hours.

0.02 gram of cetyl dimethylbenzyl ammonium chloride, 0.04 gram of a wetting agent (Triton X-100, trade name of, and manufactured by Rohm & Haas Co., Philadelphia, Pa.), and 1 gram of dimethylolurea (Arboneeld A, trade name of, and manufactured by Polychemicals Department of E. I. du Pont de Nemours & Co., Wilmington, Del.) dissolved in approximately 20 cc. of water were added to the solution. The solution was filtered, then heated to 95° C. and held at this temperature for approximately 5 hours. The solution was then cast into a film. After casting, the film was stretched to provide its molecular orientation and dyed with a dichroic direct cotton dye.

Figure 5:
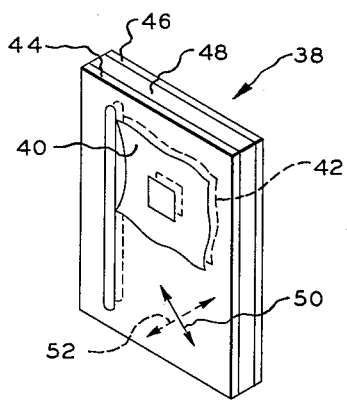
FIG. 5 is a diagrammatic perspective view of a three-dimensional print of the invention comprising film materials of the type shown in FIGS. 1–4 and embodying a stereoscopic pair of light-polarizing images.

Referring to FIG. 5, there is illustrated a composite film unit 38 in which is included a pair of stereoscopic dichroic dye light-polarizing images 40 and 42 formed, respectively, in films or layers 44 and 46. The layers 44 and 46 may be considered as of the type shown in FIGS. 1 and 3 and are bonded to a transparent central supporting layer 48. Assuming, for simplicity of explanation, that the stereoscopic images are rendered in monochrome, the light-polarizing images 40 and 42 are printed on the opposite exposed surfaces of the assembly in proper relative register for stereo viewing. The molecular orientation of the layers 44 and 46 is indicated by the double-headed arrows 50 and 52, it being noted that the direction of orientation of each layer is at 45° to an edge of the assembly and at 90° to one another, this constituting a preferred, although not inflexible, arrangement.

Formation of the positive left-eye image 40 and the positive right-eye image 42 on layers 44 and 46, respectively, is carried out by transferring the dichroic dye from individual left- and right-eye positive printing matrices, the printed images generally overlying one another in accordance with the usual stereoscopic relationship of light-polarizing images. Where a stereoscopic print is rendered in full color, right- and left-eye sets of matrices, each set comprising red, green and blue color-separation positives, are employed to form the images. The three matrices of each set are impregnated, respectively, with cyan, magenta and yellow dichroic direct cotton dyes. Each matrix of a given set is then used in succession to transfer its respective color image to one of the molecularly oriented layers, the matrices of the first set, for example, being used to transfer the right-eye color images to the layer 46, the matrices of the second set being similarly employed to transfer the left-eye color images to the other molecularly oriented layer 44. Viewing of the stereoscopic print is performed through light-polarizing glasses or viewers having polarizing axes appropriately crossed with respect to the images to be viewed.

While the stereoscopic print assembly of FIG. 5 is shown as an individual print which may be employed as a transparency or, with the added application of a reflection backing to layer 46, as a reflection print, and although either of said forms of individual print constitute a useful embodiment of the film material of the invention, the print assembly may also be considered as illustrative of a frame of stereoscopic motion picture film. The present film material is particularly suitable for use in the motion picture field where the high magnifications involved usually require a high order of dye densitives and image resolution. The light-polarizing film of the invention is capable of embodying dichroic dye images having densities of the order of at least 3 and an image resolution in excess of 60 lines per millimeter.

An important consideration in the production of light-polarizing stereoscopic pairs is the substantial reduction in perceptability of unwanted so-called ghost images. A ghost image is sometimes visible when viewing a light-polarizing stereoscopic print or a projected image through light-polarizing viewers, even though the viewers are properly oriented, and can be very troublesome. Such an image is a relatively weak right-eye image which is visible to the left eye in addition to the left-eye image intended to be viewed by said eye, or it is a relatively weak left-eye image which is visible to the right eye in addition to the right-eye image intended to be viewed by said eye. It will be understood that the polarizing direction or axis of these unwanted densities or ghost images is substantially parallel to that of the analyzer through which they are seen and that in an ideal polarizer this density which is $d_1$ of the density ratio $d_2/d_1$ would be zero and hence invisible. However, a dichroic dye polarizer does not quite satisfy this standard of an ideal polarizer and $d_1$ represents a density value which, although small, may, nevertheless, be sufficient to permit its being visible under the above-described circumstances. The importance in this respect of the high density ratios which are characteristic of the light-polarizing film materials of the present invention will thus be apparent, when $d_2$ is made a given suitable density for the purpose, said ratios permitting $d_1$ to be so small as to render the unwanted density unnoticeable.

Transfer of dichroic dye images to the molecularly oriented film is preferably performed with the film preliminarily wetted to insure that contact between the printing matrix and film exists throughout the image area and to facilitate transfer of the dye. Water, an aqueous solution of sodium acetate or a mixture of sodium salicylate and sodium acetate or some other reagent or reagents, may be employed for the purpose.

It is to be understood that where a hydroxyl-containing, vinyl polymer, and more particularly polyvinyl alcohol, has been specified herein as a film material, a polymer which has not been completely hydrolyzed, i.e., polyvinyl alcohol having a small residual quantity of acetate groups as, for example, a partially de-esterified polyvinyl ester, could be employed for the purpose.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A light-polarizing film material exhibiting an improved dichroic ratio and polarizing efficiency, said film material comprising a molecularly oriented layer formed from a high molecular weight, hydroxyl-containing vinyl polymer and a high molecular weight, basic nitrogen-containing polymer, said layer including a cross-linking agent, and at least one dichroic direct cotton dye, said cross-linking agent being selected from the class consisting of dimethylolurea, boric acid, glyoxal, and diphenyl diisocyanate, the light-polarizing film material having a dye density which is higher than that which would exist without said basic nitrogen-containing polymer and said light-polarizing film material, due to the coaction of said cross-linking agent with said hydroxyl-containing vinyl polymer and basic nitrogen-containing polymer, maintaining its established molecular orientation and having a dichroic ratio which is superior to that of an organic dye light polarizer formed from similar vinyl and nitrogen-containing polymers and a similar dichroic dye, but which is devoid of said cross-linking agent.

2. A light-polarizing film material exhibiting an improved dichroic ratio and polarizing efficiency, said film material comprising a molecularly oriented, high molecular weight, hydroxyl-containing vinyl polymer, a molecularly oriented high molecular weight, basic nitrogen-containing polymer, a cross-linking agent selected from the class consisting of dimethylolurea, boric acid, glyoxal, and diphenyl diisocyanate, and at least one dichroic direct cotton dye, said basic nitrogen-containing polymer being selected from the class consisting of a derivative of an amino aldehyde, deacetylated chitin, a $\beta$-diethylaminoethylmethacrylate polymer, and a polyvinyl pyridine quaternary ammonium salt, the light-polarizing film material having a dye density which is higher than that which would exist without said basic nitrogen-containing polymer and said light-polarizing film material, due to the coaction of said cross-linking agent with said hydroxy-containing vinyl polymer and basic nitrogen-containing polymer, maintaining its established molecular orientation and having a dichroic ratio which is superior to that of an organic dye light polarizer formed from similar vinyl and nitrogen-containing polymers and a similar dichroic dye, but which is devoid of said cross-linking agent.

3. A light-polarizing film material exhibiting an improved dichroic ratio and polarizing efficiency, said film material substantially comprising the molecularly oriented reaction product of a high molecular weight, hydroxyl-containing vinyl polymer and a quaternary salt of an amino aldehyde reacted in the presence of an acid catalyst, a cross-linking agent, and at least one dichroic direct cotton dye, said cross-linking agent being selected from the class consisting of dimethylolurea, boric acid, glyoxal, and diphenyl diisocyanate, the light-polarizing film material having a dye density which is higher than that which would exist without said basic nitrogen-containing polymer and said light-polarizing film material, due to the coaction of said cross-linking agent with said hydroxyl-containing vinyl polymer and basic nitrogen-containing polymer, maintaining its established molecular orientation and having a dichroic ratio which is superior to that of an organic dye light polarizer formed from similar vinyl and nitrogen-containing polymers and a similar dichroic dye, but which is devoid of said cross-linking agent.

4. A light-polarizing film material as defined in claim 3 wherein said reaction product is an amino acetal of polyvinyl alcohol and said cross-linking agent is dimethylolurea.

5. A light-polarizing film material as defined in claim 1 wherein said cross-linking agent is dimethylolurea.

6. A light-polarizing film material as defined in claim 5 wherein said basic nitrogen-containing polymer is a derivative of an amino aldehyde.

7. A light-polarizing film material exhibiting an improved dichroic ratio and polarizing efficiency, said film material comprising a molecularly oriented layer formed substantially of the reaction product of a high molecular weight, hydroxyl-containing vinyl polymer and a quaternary salt of an amino aldehyde, a cross-linking agent selected from the class consisting of dimethylolurea, boric acid, glyoxal and diphenyl diisocyanate, and at least one dichroic direct cotton dye, the light-polarizing film material having a dye density which is higher than that which would exist without said basic nitrogen-containing polymer and said light-polarizing film material, due to the coaction of said cross-linking agent with said hydroxyl-containing vinyl polymer and basic nitrogen-containing polymer, maintaining its established molecular orientation and having a dichroic ratio which is superior to that of an organic dye light polarizer formed from similar vinyl and nitrogen-containing polymers and a similar dichroic dye, but which is devoid of said cross-linking agent.

8. A composite light-polarizing print including at least one stereoscopic pair of light-polarizing images, said print comprising a transparent, dimensionally-stable, plastic, supporting layer, and a pair of individual transparent molecularly oriented layers laminated to the opposite surfaces of said supporting layer, each of said molecularly oriented layers being formed from a high molecular weight, hydroxyl-containing vinyl polymer and a high molecular weight, basic nitrogen-containing polymer and including a cross-linking agent and an imagewise distribution of at least one dichroic direct cotton dye, the direction of molecular orientation of one of said layers being disposed substantially at an angle of 90° with respect to that of the other of said layers, said cross-linking agent being selected from the class consisting of dimethylolurea, boric acid, glyoxal, and diphenyl diisocyanate, the light-polarizing images having a dye density which is higher than that which would exist without said basic nitrogen-containing polymer and, due to the coaction of said cross-linking agent with said hydroxyl-containing vinyl polymer and basic nitrogen-containing polymer, having a dichroic ratio which is superior to that of an organic dye light-polarizing image formed within similar vinyl and nitrogen-containing polymers and employing a similar dichroic dye, but which is devoid of said cross-linking agent.

9. A composite light-polarizing print as defined in claim 7 wherein an imagewise distribution of a plurality of dichroic direct cotton dyes of different colors is provided in each of said molecularly oriented layers to form a multicolor image therewithin.

10. A composite light-polarizing print including a stereoscopic pair of multicolor light-polarizing images, said print comprising a transparent, dimensionally-stable, plastic, supporting layer, and a pair of transparent, molecularly oriented layers laminated to opposite surfaces of said supporting layer, each of said molecularly oriented layers comprising a high molecular weight, hydroxyl-containing vinyl polymer and a high molecular weight, basic nitrogen-containing polymer, a cross-linking agent selected from the class consisting of dimethylolurea, boric acid, glyoxal, and diphenyl diisocyanate, and a multicolor image formed from a plurality of dichroic direct cotton dyes, the multicolor image of one layer being registered with that of the other layer for stereoscopic viewing, said basic nitrogen-containing polymer being selected from the class consisting of a derivative of an amino aldehyde, deacetylated chitin, a β-diethylaminoethylmethacrylate polymer, and a polyvinyl pyridine quaternary ammonium salt the light-polarizing images having a dye density which is higher than that which would exist without said basic nitrogen-containing polymer and, due to the coaction of said cross-linking agent with said hydroxyl-containing vinyl polymer and basic nitrogen-containing polymer, having a dichroic ratio which is superior to that of an organic dye light-polarizing image formed within similar vinyl and nitrogen-containing polymers and employing a similar dichroic dye, but which is devoid of said cross-linking agent.

11. A composite light-polarizing print as defined in claim 9 wherein said vinyl polymer is polyvinyl alcohol and said cross-linking agent is dimethylolurea.

12. A process for forming a light-polarizing film material comprising the steps of preparing an aqueous solution comprising polyvinyl alcohol, a basic nitrogen-containing polymer and a cross-linking agent selected from the class consisting of dimethylolurea, boric acid, glyoxal and diphenyl diisocyanate, casting said solution into a film, stretching said film to provide a given high molecular orientation therewithin, and imbibing a dichroic direct cotton dye thereinto, said basic nitrogen-containing polymer being selected from the class consisting of a derivative of an amino aldehyde, deacetylated chitin, a β-diethylaminoethylmethacrylate polymer and a polyvinyl pyridine quaternary ammonium salt, said film material having improved dichroic ratio characteristics as compared to a light-polarizing film material formed by a process which excludes said cross-linking agent from said aqueous solution but which is otherwise identical.

13. A process for forming a light polarizing film material as defined in claim 11 wherein said cross-linking agent is dimethylolurea.

14. A process for forming a light-polarizing film material as defined in claim 12 wherein said basic nitrogen-containing polymer is a derivative of an amino aldehyde.

15. A process for forming a light-polarizing film matrial as defined in claim 13 wherein said polyvinyl alcohol and said derivative of an amino aldehyde are reacted in said solution to form an amino acetal of polyvinyl alcohol.

16. A process for forming a light-polarizing film material as defined in claim 11 wherein said dichroic direct cotton dye is applied from a printing matrix to form a light-polarizing image within said film.

17. A process for forming a light-polarizing film material comprising the steps of preparing an aqueous solution comprising polyvinyl alcohol and a basic nitrogen-containing polymer, casting said solution into a film, imbibing a cross-linking agent selected from the class consisting of dimethylolurea, boric acid, glyoxal, and diphenyl diisocyanate into said film, stretching said film to provide a given high molecular orientation therewithin, and applying an aqueous solution of a dichroic direct cotton dye to a surface of said film, said basic nitrogen-containing polymer being selected from the class consisting of a derivative of an amino aldehyde, deacetylated chitin, a β-diethylaminoethylmethacrylate polymer, and a polyvinyl pyridine quaternary ammonium salt, said film material having an improved dichroic ratio with respect to that of a light-polarizing film material formed by a process which excludes said cross-linking agent from said aqueous solution but which is otherwise identical.

18. A process for forming a light-polarizing film material as defined in claim 16 wherein said polyvinyl alcohol and said basic nitrogen-containing polymer are reacted within said solution and the reaction product thereof is cast into said film.

References Cited in the file of this patent

UNITED STATES PATENTS

| | | |
|---|---|---|
| 2,239,718 | Izard | Apr. 29, 1941 |
| 2,327,872 | Dahle | Aug. 24, 1943 |
| 2,402,166 | Land | June 18, 1946 |
| 2,445,555 | Binda | July 20, 1948 |
| 2,445,579 | Hyman et al. | July 20, 1948 |

UNITED STATES PATENT OFFICE
CERTIFICATE OF CORRECTION

Patent No. 2,996,956                     August 22, 1961

William H. Ryan et al.

It is hereby certified that error appears in the above numbered patent requiring correction and that the said Letters Patent should read as corrected below.

Column 2, line 58, for "$P_d$" read -- $R_d$ --; column 5, line 23, for "imbided" read -- imbibed --; column 7, line 57, for "dichoic" read -- dichroic --; column 9, line 45, for "densitives" read -- densities --; column 10, line 61, for "hydroxy-" read -- hydroxyl- --; column 11, line 68, for the claim reference numeral "7" read -- 8 --; column 12, line 46, for the claim reference numeral "11" read -- 12 --; same column, line 57, for the claim reference numeral "11" read -- 12 --.

Signed and sealed this 28th day of August 1962.

(SEAL)
Attest:

ESTON G. JOHNSON
Attesting Officer

DAVID L. LADD
Commissioner of Patents